(12) United States Patent
Varghese et al.

(10) Patent No.: US 12,226,949 B2
(45) Date of Patent: Feb. 18, 2025

(54) MODEL BASED SUPPORTING SPOKES ACTIVATION TO AID 3D PRINTING

(71) Applicant: The Boeing Company, Chicago, IL (US)

(72) Inventors: Sijo Varghese, Kerala (IN); Jeffrey H. Hunt, Thousand Oaks, CA (US)

(73) Assignee: THE BOEING COMPANY, Arlington, VA (US)

( * ) Notice: Subject to any disclaimer, the term of this patent is extended or adjusted under 35 U.S.C. 154(b) by 219 days.

(21) Appl. No.: 17/824,763

(22) Filed: May 25, 2022

(65) Prior Publication Data

US 2023/0382039 A1    Nov. 30, 2023

(51) Int. Cl.
| | | |
|---|---|---|
| *B29C 64/112* | (2017.01) | |
| *B29C 64/209* | (2017.01) | |
| *B29C 64/232* | (2017.01) | |
| *B29C 64/236* | (2017.01) | |
| *B29C 64/241* | (2017.01) | |
| *B29C 64/245* | (2017.01) | |
| *B29C 64/393* | (2017.01) | |
| *B33Y 10/00* | (2015.01) | |
| *B33Y 30/00* | (2015.01) | |
| *B33Y 50/02* | (2015.01) | |

(52) U.S. Cl.
CPC .......... *B29C 64/112* (2017.08); *B29C 64/209* (2017.08); *B29C 64/232* (2017.08); *B29C 64/236* (2017.08); *B29C 64/241* (2017.08); *B29C 64/245* (2017.08); *B29C 64/393* (2017.08); *B33Y 10/00* (2014.12); *B33Y 30/00* (2014.12); *B33Y 50/02* (2014.12)

(58) Field of Classification Search
CPC ... B29C 64/112; B29C 64/232; B29C 64/236; B29C 64/241; B29C 64/245; B29C 64/393; B29C 64/209; B33Y 30/00
See application file for complete search history.

(56) References Cited

U.S. PATENT DOCUMENTS

| | | | |
|---|---|---|---|
| 9,067,360 B2 | 6/2015 | Wehning et al. | |
| 10,392,131 B2 | 8/2019 | Deck et al. | |
| 2011/0252618 A1 | 10/2011 | Diekmann et al. | |
| 2016/0067740 A1* | 3/2016 | Voris ...................... | B33Y 10/00 425/150 |

(Continued)

FOREIGN PATENT DOCUMENTS

CN           112060567 A         12/2020

OTHER PUBLICATIONS

Extended European Search Report issued Sep. 26, 2023 in corresponding European Application No. 23157405.4, 11 pages.

(Continued)

*Primary Examiner* — Nahida Sultana
*Assistant Examiner* — Mohamed K Ahmed Ali
(74) *Attorney, Agent, or Firm* — MH2 Technology Law Group LLP (57) ABSTRACT

A printing bed for a three-dimensional (3D) printer includes an upper surface configured to have a plurality of droplets land thereon to form a first layer of a 3D object. The printing bed also includes a support structure. In response to the 3D object having an overhang with an angle that exceeds a predetermined threshold, the support structure is configured to actuate from a first position into a second position to support the overhang.

17 Claims, 5 Drawing Sheets

(56) References Cited

U.S. PATENT DOCUMENTS

| | | |
|---|---|---|
| 2016/0311226 A1* | 10/2016 | Bradway .............. B41J 2/16538 |
| 2017/0144371 A1 | 5/2017 | Lussier et al. |
| 2018/0020683 A1* | 1/2018 | Contractor ............. B33Y 80/00 |
| | | 426/231 |
| 2020/0164464 A1 | 5/2020 | Sievers et al. |
| 2021/0046704 A1* | 2/2021 | Huttunen .............. B29C 64/118 |
| 2021/0283856 A1 | 9/2021 | Chen et al. |
| 2022/0118700 A1 | 4/2022 | Hunt et al. |
| 2022/0226899 A1* | 7/2022 | Shinozaki ............... B22F 12/30 |

OTHER PUBLICATIONS

Chen, "A Movable 3D Printing Build Platform to Reduce Waste and Save Time—Manufactur3D," downloaded on May 6, 2022 from https://manufactur3dmag.com, 13 pages.

Chen, "How a Moving Platform for 3-D Printing Can Cut Waste and Costs," Posts by Greta Harrison on Apr. 1, 2021, 3 pages.

Xu et al., "Reusable Support for Additive Manufacturing," Additive Manufacturing 39 (2021) 101840, 13 pages.

* cited by examiner

MODEL BASED SUPPORTING SPOKES ACTIVATION TO AID 3D PRINTING

BACKGROUND

Three-dimensional (3D) printing (also referred to as additive manufacturing) is the construction of a 3D object based upon a computer model. More particularly, a 3D printer melts a printing material and then jets the liquid printing material through a nozzle to form a first layer on a substrate, a second layer on the first layer, and so on, until the 3D object is constructed. This method works well when the layers are directly on top of one another. However, some 3D objects include overhangs (i.e., a portion with a gap, rather than a printed layer, beneath it so that the nozzle spray has no direct "line of sight."). There is general rule that overhang slopes shouldn't exceed a predetermined angle when printed. The angle may range from approximately 45 degrees to 60 degrees from a vertical axis defined by the nozzle direction. This is to assure that every layer has enough support (e.g., a previous layer) to build upon.

Typically, when the overhang slope exceeds the predetermined angle, one or more support structures are constructed (e.g., also by the 3D printer) to place under the overhang to support the new layers. These support structures take time to design, print, and place. They are then discarded after the 3D object is printed. Therefore, what is needed is an improved system and method for supporting an overhang while printing a 3D object.

SUMMARY

A printing bed for a three-dimensional (3D) printer is disclosed. The printing bed includes an upper surface configured to have a plurality of droplets land thereon to form a first layer of a 3D object. The printing bed also includes a support structure. In response to the 3D object having an overhang with an angle that exceeds a predetermined threshold, the support structure is configured to actuate from a first position into a second position to support the overhang.

A three-dimensional (3D) printer is also disclosed. The printer includes a nozzle configured to jet a plurality of droplets of a printing material. The printer also includes a printing bed positioned below the nozzle. The printing bed is configured to have at least some of the droplets land thereon to form a first layer of a 3D object. An upper surface of the printing bed defines a plurality of openings. Each opening has a support structure positioned at least partially therein. Upper surfaces of the support structures are flush with an upper surface of the printing bed when the support structures are in retracted positions. The upper surfaces of the support structures are positioned above the upper surface of the printing bed when the support structures are in extended positions. The support structures are configured to actuate between the retracted and extended positions independently of one another. In response to the 3D object having an overhang with an angle that exceeds a predetermined threshold, a first of the support structures that is not positioned below the overhang is configured to remain in the retracted position, while a second and a third of the support structures that are positioned below the overhang are configured to actuate into the extended positions allow one or more of the droplets to land thereon to form and support the overhang. The second and third support structures are configured to actuate to different heights when in the extended positions based at least partially upon the angle of the overhang. After the overhang or the 3D object has cooled and solidified, the second and third support structures are configured to actuate back into the retracted positions.

A method for printing a three-dimensional (3D) object with a 3D printer is also disclosed. The method includes simulating printing the 3D object with the 3D printer using a computing system. The simulated printing includes simulating jetting a plurality of droplets through a nozzle of the 3D printer to print the 3D object on a printing bed. The 3D object includes an overhang with an angle that exceeds a predetermined threshold. The simulated printing also includes simulating actuating a support structure in the printing bed from a retracted position to an extended position to support the overhang. The simulated printing is iterated a plurality of times. A time that the support structure actuates, a height that the support structure actuates, or both are varied in the iterations. The method also includes selecting one of the times, one of the heights, or both based at least partially upon the iterations of the simulated printing. The method includes (e.g., actually physically) printing the 3D object with the 3D printer. The printing includes jetting the plurality of droplets through the nozzle of the 3D printer to print the 3D object on the printing bed. The 3D object includes the overhang with the angle that exceeds the predetermined threshold. The printing also includes actuating the support structure in the printing bed from the retracted position to the extended position to support the overhang. The support structure is actuated at the selected one of the times, to the selected one of the heights, or both.

DRAWINGS

The above and/or other aspects and advantages will become more apparent and more readily appreciated from the following detailed description of examples, taken in conjunction with the accompanying drawings, in which.

DETAILED DESCRIPTION

Exemplary aspects will now be described more fully with reference to the accompanying drawings. Examples of the disclosure, however, can be embodied in many different forms and should not be construed as being limited to the examples set forth herein. Rather, these examples are provided so that this disclosure will be thorough and complete, and will fully convey the scope to those skilled in the art. In the drawings, some details may be simplified and/or may be drawn to facilitate understanding rather than to maintain strict structural accuracy, detail, and/or scale.

It will be understood that when an element is referred to as being "on," "associated with," "connected to," "electrically connected to," or "coupled to" to another component, it may be directly on, associated with, connected to, electrically connected to, or coupled to the other component or intervening components may be present. In contrast, when a component is referred to as being "directly on," "directly associated with," "directly connected to," "directly electrically connected to," or "directly coupled to" another component, there are no intervening components present. As used herein, the term "and/or" includes any and all combinations of one or more of the associated listed items.

It will be understood that although the terms first, second, etc., may be used herein to describe various elements, components, and/or directions, these elements, components, and/or directions should not be limited by these terms. These terms are only used to distinguish one element, component, and/or direction from another element, component, and/or direction. For example, a first element, component, or direction could be termed a second element, component, or direction without departing from the teachings of examples.

Spatially relative terms, such as "beneath," "below," "lower," "above," "upper," and the like may be used herein for ease of description to describe the relationship of one component and/or feature to another component and/or feature, or other component(s) and/or feature(s), as illustrated in the drawings. It will be understood that the spatially relative terms are intended to encompass different orientations of the device in use or operation in addition to the orientation(s) depicted in the figures.

Figure 1:
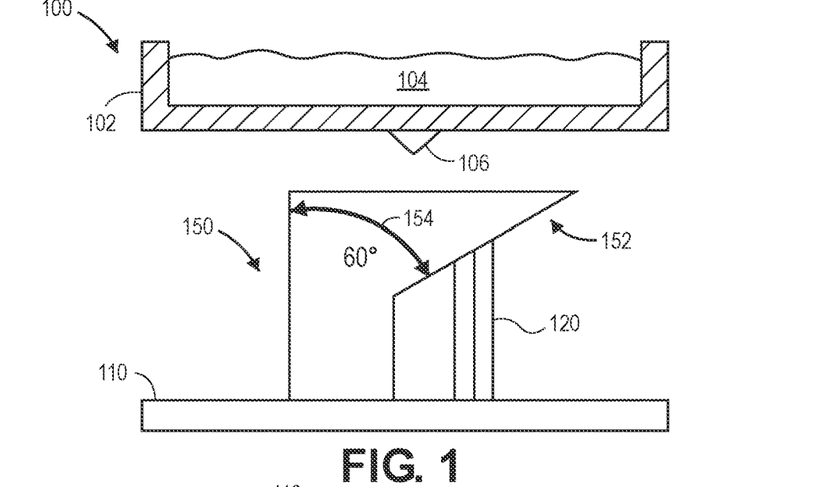
FIG. 1 illustrates a 3D printer printing a 3D object with an overhang onto a printing bed, according to an embodiment.

FIG. 1 illustrates a 3D printer 100 printing a 3D object 150 with an overhang 152 onto a printing bed 110, according to an embodiment. The 3D printer 100 may include an ejector (also referred to as a pump chamber) 102 that is configured to receive a 3D printing material 104 in a solid state. The 3D printer 100 may be configured to melt the 3D printing material 104 into a liquid state within the ejector 102. The 3D printer 100 may also include a nozzle 106 through which the liquid 3D printing material 104 may be jetted in the form of droplets. The 3D printer 100 may also include a printing bed 110 positioned below the nozzle 106. The droplets of liquid 3D printing material 104 may land on the printing bed 110 and cool and solidify to form a first layer. Additional droplets may land on the first layer and cool and solidify to form a second layer, and so on, which may cause the 3D object 150 to build upward from the printing bed 110.

In some embodiments, the 3D object 150 may include an overhang 152. The overhang 152 may be or include a portion of the 3D object 150 with a gap (e.g., air), rather than a printed layer, beneath it. The overhang 152 (e.g., the lower surface thereof) may be oriented at an angle 154 with respect to a vertical axis (e.g., through the nozzle 106). When the angle 154 exceeds a predetermined threshold, one or more support structures 120 may be used to support the overhang 152 during printing to prevent the overhang 152 from deforming or collapsing. The predetermined threshold may be about 30°, about 35°, about 40°, about 45°, about 50°, about 55°, about 60°, about 65°, or more.

The support structures 120 may extend vertically upward from the printing bed 110 and contact (e.g., support) the lower surface of the overhang 152. In one embodiment, the droplets that form the overhang 152 may be printed onto the support structures 120 (i.e., the support structures 120 may be actuated before the droplets are jetted to form the overhang 152). In another embodiment, the droplets that form the overhang 152 may not be printed onto the support structures 120 (i.e., the support structures 120 may be actuated after the droplets are jetted to form the overhang 152). For example, the support structures 120 may support the overhang 152 while it cools and solidifies.

Figure 2A:
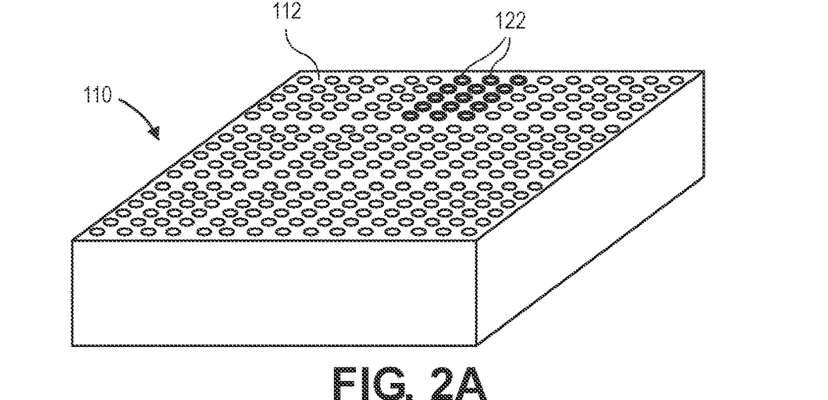
FIG. 2A illustrates a perspective view of the printing bed with a plurality of support structures in a first (e.g., retracted) position, according to an embodiment.

FIG. 2A illustrates a perspective view of the printing bed 110 with a plurality of support structures 120 in a first (e.g., retracted) position, according to an embodiment. An upper surface 112 of the printing bed 120 may define a plurality of openings, and the support structures 120 may be positioned at least partially within the openings. The support structures 120 may be or include cylindrical spokes; however, they may also have other cross-sectional shapes such as square, rectangular, etc. In the retracted position, upper ends 122 of the support structures 120 may be flush with the upper surface 112 of the printing bed 110 to form a smooth/flat surface for the first layer of the 3D object 150.

Figure 2B:
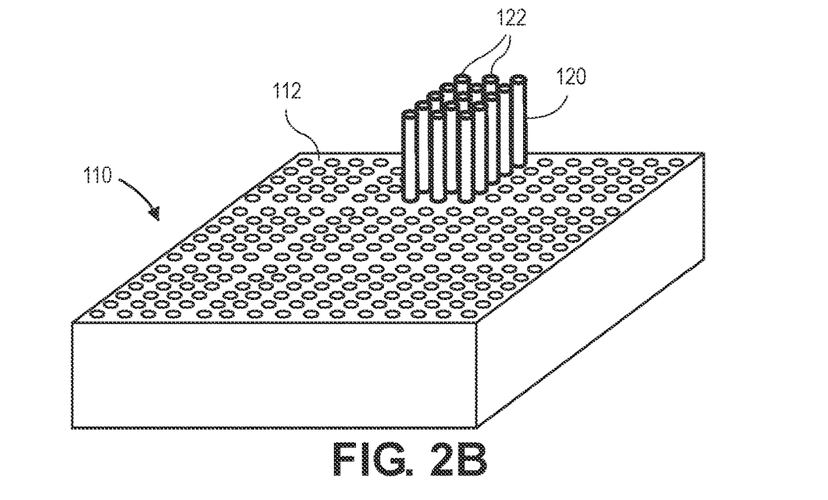
FIG. 2B illustrates a perspective view of the printing bed with some of the support structures in a second (e.g., extended) position, according to an embodiment.

FIG. 2B illustrates a perspective view of the printing bed 110 with some of the support structures 120 in a second (e.g., extended) position, according to an embodiment. The support structures 120 may be configured to actuate vertically upward (e.g., toward the ejector 102 and/or nozzle 106) from the retracted position into the extended position. The actuation may be electromechanical and/or pneumatic. In the extended position, the upper ends 122 of the support structures 120 may be positioned above the upper surface 112 of the printing bed 110. As discussed above with respect to FIG. 1, in the extended position, the support structures 120 may be configured to support the overhang 152 of the 3D object 150 while the 3D object 150 is being printed (e.g., before, during, or after the droplets are jetted to form the overhang 152). Once the 3D object 150 (e.g., the overhang 152) cools and solidifies, the support structures 120 may actuate back into the retracted position.

The support structures 120 may be controlled independently from one another. In other words, one or more of the support structures 120 may be configured to actuate before or after other of the support structures 120 based at least partially upon the shape of the overhang 152. In addition, the support structures 120 may be configured to actuate to different heights based at least partially upon the shape of the overhang 152. This is described in greater detail below.

Figure 3A:
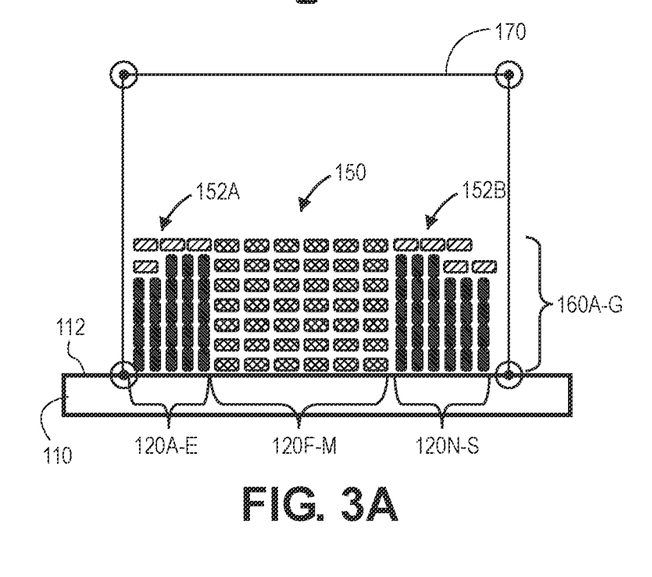
FIG. 3A illustrates a schematic side view of the printing bed with the support structures actuating into different predetermined extended positions in multiple steps based upon time, according to an embodiment.

FIG. 3A illustrates a schematic side view of the printing bed 110 with the support structures 120A-120S actuating into different extended positions in multiple steps based upon time, according to an embodiment. More particularly, the time and/or vertical distance that the support structures 120 actuate may be based at least partially upon inputs such as the time that layers 160A-160G of the 3D object 150 are printed, the position (e.g., surface area) of the layers 160A-160G, the volume of the 3D object 150, the print speed (e.g., the rate at which the droplets are jetted through the nozzle 106), a defined control volume 170 in which the 3D object 150 is printed, or a combination thereof. In one embodiment, the support structures 120A-120S may be actuated upward in multiple steps (e.g., increments) based at least partially upon time (e.g., based at least partially upon the inputs described above and/or coordinates in the control volume 170) to reach the height in the +Z direction where the support structures 120A-120S may be needed to support the overhang(s) 152A, 152B to initiate the print when the angle 154 is greater than the predetermined threshold (e.g., 60°). The support structures 120A-120S may be actuated in steps as each layer 160A-160G of the 3D object 150 is finished, such that the support structures 120A-120S assigned to be at each time may either actuate or remain in place depending upon the feature of the 3D object 150 to be printed.

In the example shown in FIG. 3A, nineteen support structures are shown 120A-120S in the printing bed 110, and the 3D object 150 has seven layers: 160A-160G. The 3D object 150 has two overhangs 152A, 152B with angles that are greater than the predetermined threshold. The overhangs 152A, 152B are in the layers 160F and 160G.

Before printing begins, a computing system may receive or generate a model of the 3D object 150. The 3D printer 100 may print the 3D object 150 based at least partially upon the model. As a result, the computing system may be able to determine which of the support structures 120A-120E and 120N-120S may be positioned below the overhangs 152A, 152B, and which support structures 120F-120M may not be positioned below the overhangs 152A, 152B. In an embodiment, only the support structures 120A-120E and 120N-120S positioned below the overhangs 152A, 152B may be actuated upwards, and the remaining support structures 120F-120M may remain flush with the upper surface 112 of the printing bed 110.

As printing begins, the 3D printer 100 may jet droplets out through the nozzle 106 to form the first layer 160A of the 3D object 150 on the printing bed 110. The time that each droplet is jetted, lands, and/or solidifies may be determined by the computing system. The time that each layer 160A-160G has solidified may also be determined by the computing system.

The support structures 120A-120E and 120N-120S may actuate upward in steps based at least partially upon one or more of the time(s) determined above. In one embodiment, the support structures 120A-120E and 120N-120S (that will support the overhangs 152A, 152B) may actuate upward a first step before, during, or after the printing of the first layer 160A. In this embodiment, the distance that the support structures 120A-120E and 120N-120S actuate upward may be substantially the same as the height of the first layer 160A. In another embodiment, the support structures 120A-120E and 120N-120S (that will support the overhangs 152A, 152B) may actuate upward a first step before, during, or after two or more of the layers 160A-160G have been printed. In this embodiment, the distance that the support structures 120A-120E and 120N-120S actuate upward may be substantially the same as the height of the two or more layers 160A-160G that have been printed. As used herein, "substantially the same" refers to within 1 mm, within 0.5 mm, or within 0.1 mm.

This process may continue until the support structures 120A-120E and 120N-120S have actuated multiple steps and reach the height of the lower surface of the overhangs 152A, 152B. In the example shown, the support structures 120A-120B and 120Q-120S may actuate a plurality of steps (e.g., four steps) to have a height that is substantially the same as the fourth layer 160D or fifth layer 160E. However, the support structures 120A-120B and 120Q-120S may not actuate any higher. This may allow droplets to be printed onto the support structures 120A-120B to form part of the first overhang 152A and droplets to be printed onto the support structures 120Q-120S to form part of the second overhang 152B. Similarly, the support structures 120C-120E and 120N-120P may actuate a plurality of steps (e.g., five steps) to have a height that is substantially the same as the fifth layer 160E or sixth layer 160F. However, the support structures 120C-120E and 120N-120P may not actuate any higher. This may allow droplets to be printed onto the support structures 120C-120E to form part of the first overhang 152A and droplets to be printed onto the support structures 120N-120P to form part of the second overhang 152B. After the overhangs 152A, 152B cool (and/or the 3D object 150 cools), the 120A-120E and 120N-120S may retract back into the printing bed 110.

Figure 3B:
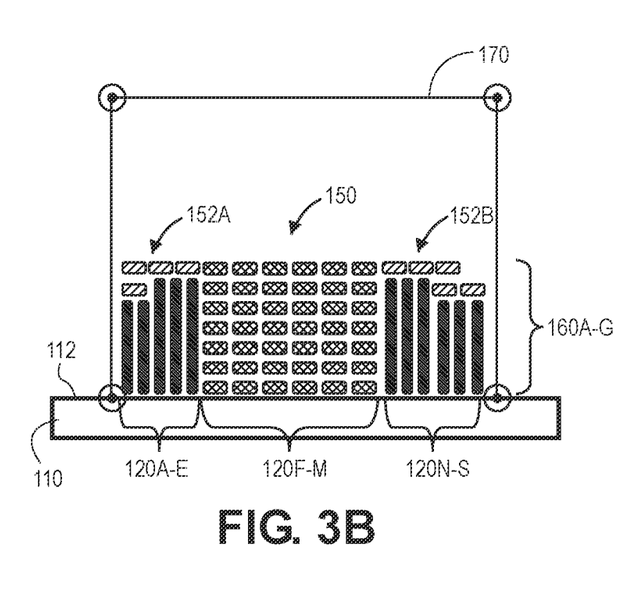
FIG. 3B illustrates a schematic side view of the printing bed with the support structures actuating into different predetermined extended positions in a single step based upon time, according to an embodiment.

FIG. 3B illustrates a schematic side view of the printing bed 110 with the support structures 120A-120S actuating into different predetermined extended positions in a single step based upon time, according to an embodiment. In FIG. 3B, the support structures 120A-120E and 120N-120S may actuate upward in a single step based upon the time(s) determined above (e.g., the time that the droplets are jetted, land, and/or solidify). For example, the support structures 120A-120B and 120Q-120S may remain flush with the printing bed 110 until the fourth layer 160D or fifth layer 160E is printed, and then the support structures 120A-120B and 120Q-120S may actuate upward to have substantially the same height as the fourth layer 160D or fifth layer 160E to support the overhangs 152A and 152B. The support structures 120C-120E and 120N-120P may remain flush with the printing bed 110 until the fifth layer 160E or sixth layer 160F is printed, and then the support structures 120C-120E and 120N-120P may actuate upward to have substantially the same height as the fifth layer 160E or sixth layer 160F to support the overhangs 152A and 152B.

Figure 4A:
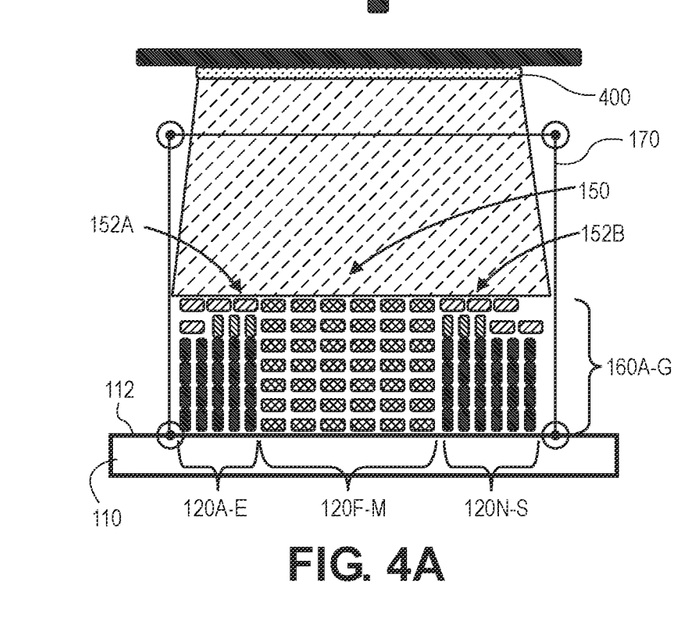
FIG. 4A illustrates a schematic side view of the printing bed with the support structures actuating into different predetermined extended positions in multiple steps based upon position, according to an embodiment.

FIG. 4A illustrates a schematic side view of the printing bed 110 with the support structures 120A-120S actuating into different predetermined extended positions in multiple steps based upon position, according to an embodiment. More particularly, the time and/or vertical distance that the support structures 120A-120S actuate may be based at least partially upon inputs such as the distance between the layers 160A-160G of the 3D object 150 and a sensor 400, the surface area of each layer 160A-160G, the volume of the 3D object 150, the print speed of the 3D printer 100 within the defined control volume and coordinate system. In one embodiment, the sensor 400 may be or include a downward facing ultra-sonic sensor that is configured to determine the distance between the current top layer and the sensor 400. This multi-step approach may be based upon the position of the layers 160A-160G (e.g., as determined based upon the inputs mentioned above, the coordinates in the control volume 170, and/or the measurements from the sensor 400) to reach the height in the +Z direction where the support structures 120A-120S may be needed to support the overhang(s) 152A, 152B to initiate the print when the angle 154 is greater than the predetermined threshold (e.g., 60°). The support structures 120A-120S may be actuated in steps as each layer 160A-160G of the 3D object 150 is finished, such that the support structures 120A-120S assigned to be at each time may either actuate or remain in place depending upon the feature of the 3D object 150 to be printed.

In the example shown in FIG. 4A, nineteen support structures are shown 120A-120S in the printing bed 110, and the 3D object 150 has seven layers: 160A-160G. The 3D object 150 has two overhangs 152A, 152B with angles that are greater than the predetermined threshold. The overhangs 152A, 152B are in the layers 160F and 160G.

Before printing begins, the computing system may generate or receive a model of the 3D object 150. The 3D printer 100 may print the 3D object 150 based at least partially upon the model. As a result, the computing system may be able to determine which of the support structures 120A-120E and 120N-120S may be positioned below the overhangs 152A, 152B, and which support structures 120F-120M may not be positioned below the overhangs 152A, 152B. In an embodiment, only the support structures 120A-120E and 120N-120S positioned below the overhangs 152A, 152B may be actuated upwards, and the remaining support structures 120F-120M may remain flush with the upper surface 112 of the printing bed 110.

As printing begins, the 3D printer 100 may jet droplets 104 out through the nozzle 106 to form the first layer 160A of the 3D object 150 on the printing bed 110. The height of the most recently deposited droplet(s) and/or layer 160A-160G (i.e., the distance between the current top surface of the 3D object 150 and the sensor 400) may be measured by the sensor 400.

The support structures 120A-120E and 120N-120S may actuate upward in steps based at least partially upon the height/distance determined above. In one embodiment, the support structures 120A-120E and 120N-120S (that will support the overhangs 152A, 152B) may actuate upward a first step before, during, or after the printing of the first layer 160A. In this embodiment, the distance that the support structures 120A-120E and 120N-120S actuate upward may be substantially the same as the height of the first layer 160A. In another embodiment, the support structures 120A-120E and 120N-120S (that will support the overhangs 152A, 152B) may actuate upward a first step before, during, or after two or more of the layers 160A-160G have been printed. In this embodiment, the distance that the support structures 120A-120E and 120N-120S actuate upward may be substantially the same as the height of the two or more layers 160A-160G that have been printed. As used here, substantially the same refers to within 1 mm, within 0.5 mm, or within 0.1 mm.

This process may continue until the support structures 120A-120E and 120N-120S have actuated multiple steps and reach the height of the lower surface of the overhangs 152A, 152B. In the example shown, the support structures 120A-120B and 120Q-120S may actuate a plurality of steps (e.g., four steps) to have a height that is substantially the same as the fourth layer 160D or fifth layer 160E. However, the support structures 120A-120B and 120Q-120S may not actuate any higher. This may allow droplets to be printed onto the support structures 120A-120B to form part of the first overhang 152A and droplets to be printed onto the support structures 120Q-120S to form part of the second over hand 152B. Similarly, the support structures 120C-120E and 120N-120P may actuate a plurality of steps (e.g., five steps) to have a height that is substantially the same as the fifth layer 160E or sixth layer 160F. However, the support structures 120C-120E and 120N-120P may not actuate any higher. This may allow droplets to be printed onto the support structures 120C-120E to form part of the first overhang 152A and droplets to be printed onto the support structures 120N-120P to form part of the second over hand 152B. After the overhangs 152A, 152B cool (and/or the 3D object 150 cools), the 120A-120E and 120N-120S may retract back into the printing bed 110.

Figure 4B:
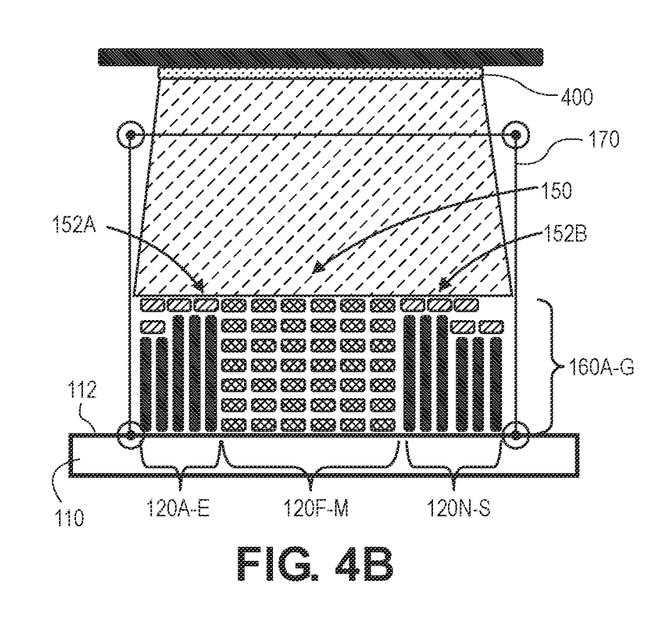
FIG. 4B illustrates a schematic side view of the printing bed with the support structures actuating into different predetermined extended positions in a single step based upon position, according to an embodiment.

FIG. 4B illustrates a schematic side view of the printing bed with the support structures actuating into different predetermined extended positions in a single step based upon position, according to an embodiment. In FIG. 4B, the support structures 120A-120E and 120N-120S may actuate upward in a single step based upon the distance(s) determined above (e.g., the distance between the 3D object 150 and the sensor 400). For example, the support structures 120A-120B and 120Q-120S may remain flush with the printing bed 110 until the fourth layer 160D or fifth layer 160E is printed, and then the support structures 120A-120B and 120Q-120S may actuate upward to have substantially the same height as the fourth layer 160D or fifth layer 160E to support the overhangs 152A and 152B. The support structures 120C-120E and 120N-120P may remain flush with the printing bed 110 until the fifth layer 160E or sixth layer 160F is printed, and then the support structures 120C-120E and 120N-120P may actuate upward to have substantially the same height as the fifth layer 160E or sixth layer 160F to support the overhangs 152A and 152B.

Figure 5:
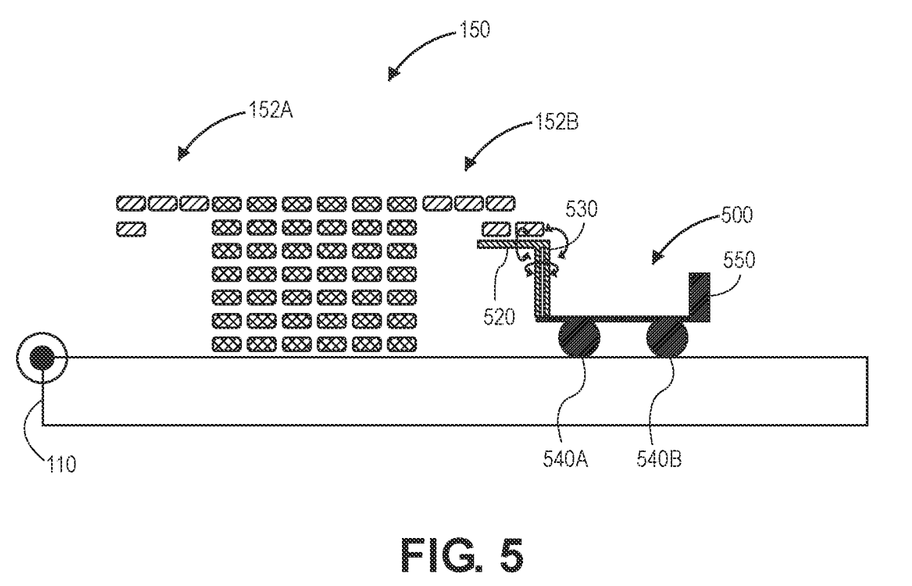
FIG. 5 illustrates a schematic side view of the printing bed with a support apparatus, according to an embodiment.

FIG. 5 illustrates a schematic side view of the printing bed 110 with a support apparatus 500, according to an embodiment. The support apparatus 500 may be or include a moveable cart. For example, the support apparatus 500 may include a support structure 520 that is configured to support the overhang(s) 152A, 152B during printing. In one embodiment, unlike the support structures 120 described above, the support structure 520 may be substantially horizontal rather than vertical. The support structure 520 may include a planar surface (e.g., an autonomous platform) that is configured to support the lower surface of the overhang(s) 152A, 152B. The support structure 520 is configured to move in one, two, or three dimensions (e.g., longitudinal, vertical, and lateral), as well as pivot around a point and/or rotate around an axis, as shown by the arrows. In one example, the support structure 520 may be actuated to have substantially the same angle as the lower surface of the overhang(s) 152A, 152B. The movement of the support structure 520 may be based on the coordinate system of the printing bed 110, where one corner may be a datum with the coordinates (0,0,0), while the new layer that requires support may pinpoint a location in the 3D coordinate system for the support structure 520 to intercept. The inputs to enable movement of the support structure 520 may be or include the downward facing ultrasonic sensor 400 to determine the time when the current top layer requires support for printing to commence.

The support apparatus 500 may also include a neck 530 that is configured to raise and lower the support structure 520 to the level of the overhang(s) 152A, 152B. The neck 530 may also be configured to move the support structure 520 in the longitudinal and/or lateral directions. The support apparatus 500 may also include one or more wheels (two are shown: 540A, 540B). The wheels 540A, 540B may be configured to move the support apparatus 500 around the surface of the printing bed 110. In one example, the wheels 540A, 540B may be configured to move along tracks and/or rails on the printing bed 110. The support apparatus 500 may also include a counterweight 550 that is configured to counter the weight of the support structure 520, the neck 530, and/or the overhang(s) 152A, 152B being supported. In one embodiment, the counterweight 550 may house the electronics of the support apparatus 500.

The printing bed 110 may be configured to move in 3 dimensions (e.g., along the X, Y, and Z axes). The printing bed 110 may also or instead be configured to rotate or swivel. Accordingly, the support apparatus (e.g., the wheels 540A, 540B) may also be configured to move in 3 dimensions, rotate, and/or swivel to provide 360 degree movement.

Figure 6:
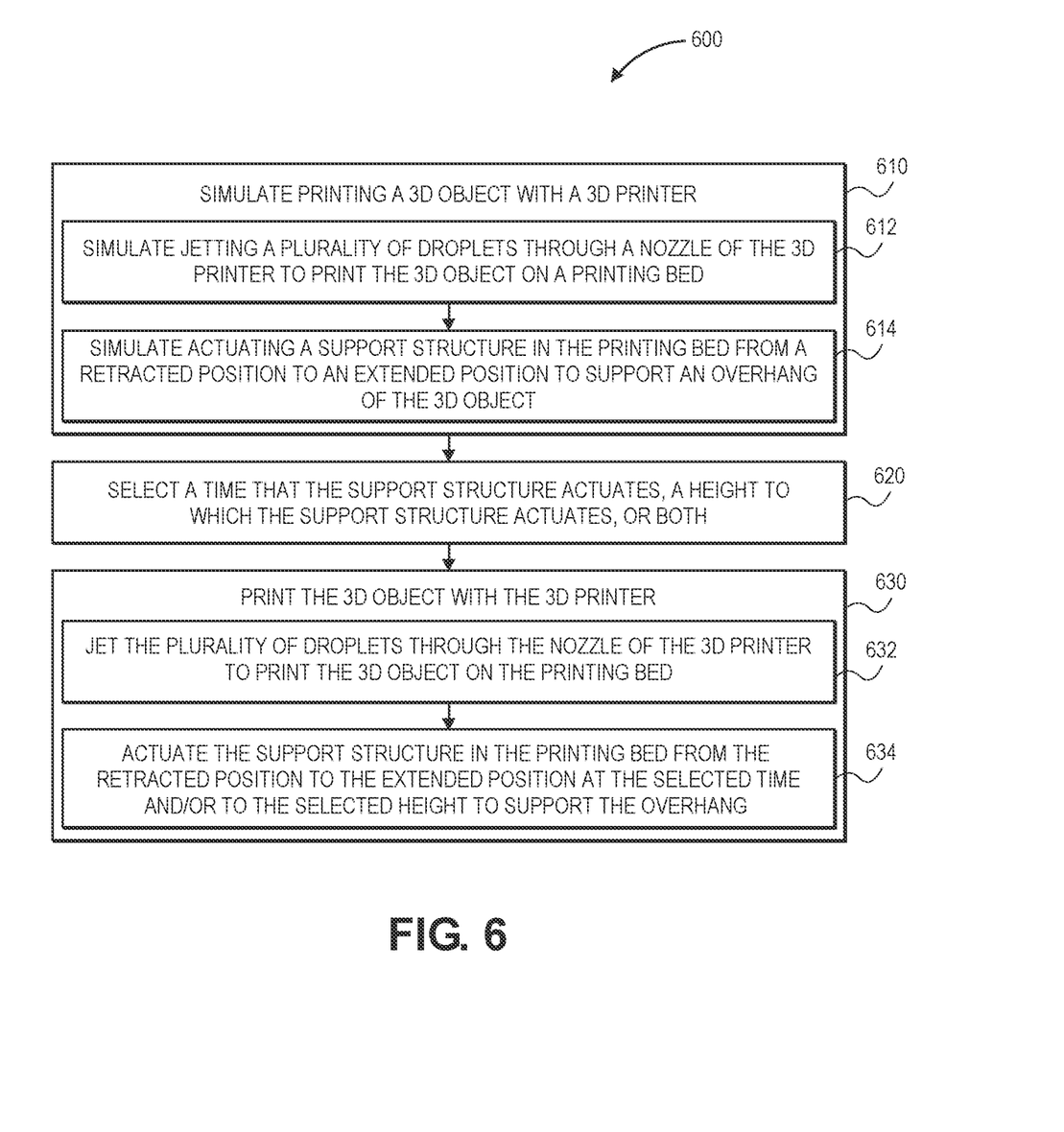
FIG. 6 illustrates a flowchart of a method for printing a 3D object with an overhang using the 3D printer, according to an embodiment.

FIG. 6 illustrates a flowchart of a method for printing a 3D object with an overhang using the 3D printer, according to an embodiment. An illustrative order of the method 600 is provided below; however, one or more steps of the method 600 may be performed in a different order, combined, split into sub-steps, repeated, or omitted.

The support structures 120 may be specific in a virtual environment which may translate or actuate the support structures 120 in the real world before initiating the print. The support structure 120 may be morphed in a virtual environment, and then the print may be simulated. The requirements of the 3D object may be verified, and the virtual print may be validated. The virtual print may be run in higher frames per second (FPS) if required for quality review. The position data of the support structures 120 in the virtual environment may be translated to the real/physical world before printing. Then, the printing of the 3D object 150 may begin. The printed 3D object may then be validated against the 3D printed object in the virtual environment.

In one embodiment, the method 600 may include simulating printing the 3D object 150 with the 3D printer 100 using a computing system, as at 610. The simulated printing may take place in a simulated environment (e.g., in the computing system rather than in the real/physical world). The simulated printing may include simulating jetting a plurality of droplets through the nozzle 106 of the 3D printer 100 to print the 3D object 150 on the printing bed 110, as at 612. The 3D object 150 includes the overhang 152 with the angle 154 that exceeds a predetermined threshold. The simulated printing may also include simulating actuating the support structure 120 in the printing bed 110 from the retracted position to the extended position to support the overhang 152, as at 614. The simulated printing may be iterated a plurality of times. In one embodiment, a time that the support structure 120 actuates may be varied in the different iterations. In another embodiment, a height that the support structure 120 actuates may be varied in the different iterations. The results of the simulation(s) may be analyzed and/or validated.

The method 600 may also include selecting one of the times, one of the heights, or both, as at 620. The time and/or height may be selected based at least partially upon the iterations of the simulated printing. More particularly, the time and/or height that optimizes the printing of the 3D object 150 may be selected. The optimization may refer to the shape of the overhang 152 (e.g., preventing deformation or collapse), the speed of the printing of the overhang 152, or the like.

The method 600 may also include printing the 3D object 150 with the 3D printer 100, as at 630. The printing may take place in the real/physical world (e.g., not in the simulated environment). The printing may include jetting the plurality of droplets through the nozzle 106 of the 3D printer 100 to print the 3D object 150 on the printing bed 110, as at 632. The 3D object 150 may include the overhang 152 with the angle 154 that exceeds the predetermined threshold. The printing may also include actuating the support structure 120 in the printing bed 110 from the retracted position to the extended position to support the overhang 152, as at 634. The support structure 120 may be actuated at the selected one of the times, to the selected one of the heights, or both (e.g., to optimize the printing of the overhang 152).

As will be appreciated, the system 100 and method 600 described herein may reduce print time as there are no conventional support structures to print. The system 100 and method 600 may also reduce material waste because there are no conventional support structures to discard. The system 100 and method 600 may also reduce post-processing time and improve material finishes. The system 100 and method 600 may also increase through-put and output of the 3D printer 100. The system 100 and method 600 may also print the 3D object 150 based upon the model in the simulated environment and the validation. The system 100 and method 600 may also reduce the chance of error during the printing.

While the foregoing disclosure has been described in some detail by way of illustration and example for purposes of clarity and understanding, it will be clear to one of ordinary skill in the art from a reading of this disclosure that various changes in form and detail can be made without departing from the true scope of the disclosure and may be practiced within the scope of the appended claims. For example, all the methods, systems, and/or component parts or other aspects thereof can be used in various combinations. All patents, patent applications, websites, other publications or documents, and the like cited herein are incorporated by reference in their entirety for all purposes to the same extent as if each individual item were specifically and individually indicated to be so incorporated by reference.

What is claimed is:

1. A printing bed for a three-dimensional (3D) printer, the printing bed comprising:
    an upper surface configured to have a plurality of droplets land thereon to form a first layer of a 3D object; and
    a support apparatus that is configured to move on the upper surface, wherein the support apparatus comprises a support structure and is configured to move the support structure in three dimensions, to rotate the support structure around an axis, to pivot the support structure around a point, or a combination thereof, wherein, in response to the 3D object comprising an overhang with an angle that exceeds a predetermined threshold, the support structure is configured to actuate from a first position into a second position to have the same angle as the overhang and to support the overhang, and wherein the support apparatus comprises:
        one or more wheels that move on the upper surface, wherein the one or more wheels are configured to rotate, swivel, or both to allow the support apparatus to move on the upper surface with a 360 degree range of motion; and
        a counterweight positioned on an opposite side of the one or more wheels from the support structure, wherein the counterweight is configured to counter a weight of the support structure, the overhang, or both, and wherein the counterweight comprises electronics of the support apparatus.

2. A three-dimensional (3D) printer, comprising:
    a nozzle configured to jet a plurality of droplets of a printing material;
    a printing bed positioned below the nozzle, wherein the printing bed is configured to have at least some of the droplets land thereon to form a first layer of a 3D object; and
    a support apparatus that is configured to move on the upper surface, wherein the support apparatus comprises a support structure and is configured to move the support structure in three dimensions, to rotate the support structure around an axis, to pivot the support structure around a point, or a combination thereof, wherein, in response to the 3D object comprising an overhang with an angle that exceeds a predetermined threshold, the support structure is configured to actuate from a first position into a second position to have the same angle as the overhang and to support the overhang, and wherein the support apparatus comprises:
        one or more wheels that move on the upper surface, wherein the one or more wheels are configured to rotate, swivel, or both to allow the support apparatus to move on the upper surface with a 360 degree range of motion; and a counterweight positioned on an opposite side of the one or more wheels from the support structure, wherein the counterweight is configured to counter a weight of the support structure, the overhang, or both, and wherein the counterweight comprises electronics of the support apparatus.

3. A method for printing a three-dimensional (3D) object with a 3D printer, the method comprising:

simulating printing the 3D object with the 3D printer using a computing system, wherein the simulated printing comprises:

simulating jetting a plurality of droplets through a nozzle of the 3D printer to print the 3D object on a printing bed, wherein the printing bed comprises:

an upper surface configured to have the plurality of droplets land thereon to form a first layer of the 3D object; and a support apparatus that is configured to move on the upper surface, wherein the support apparatus comprises a support structure and is configured to move the support structure in three dimensions, to rotate the support structure around an axis, to pivot the support structure around a point, or a combination thereof, wherein, in response to the 3D object comprising an overhang with an angle that exceeds a predetermined threshold, the support structure is configured to actuate from a first position into a second position to have the same angle as the overhang and to support the overhang, and wherein the support apparatus comprises:

one or more wheels that move on the upper surface, wherein the one or more wheels are configured to rotate, swivel, or both to allow the support apparatus to move on the upper surface with a 360 degree range of motion; and a counterweight positioned on an opposite side of the one or more wheels from the support structure, wherein the counterweight is configured to counter a weight of the support structure, the overhang, or both, and wherein the counterweight comprises electronics of the support apparatus; and simulating actuating the support structure in the printing bed from a retracted position to an extended position to have the same angle as the overhang and to support the overhang in response to the 3D object comprising the overhang with the angle that exceeds the predetermined threshold, wherein the simulated printing is iterated a plurality of times, and wherein a time that the support structure actuates, a height that the support structure actuates, or both are varied in the iterations;

selecting one of the times, one of the heights, or both based at least partially upon the iterations of the simulated printing; and printing the 3D object with the 3D printer, wherein the printing comprises:

jetting the plurality of droplets through the nozzle of the 3D printer to print the 3D object on the printing bed, wherein the 3D object comprises the overhang with the angle that exceeds the predetermined threshold; and actuating the support structure in the printing bed from the retracted position to the extended position to have the same angle as the overhang and to support the overhang in response to the 3D object comprising the overhang with the angle that exceeds the predetermined threshold, wherein the support structure is actuated at the selected one of the times, to the selected one of the heights, or both.

4. The method of claim 3, further comprising measuring a height of the 3D object or a distance between an upper layer of the 3D object and a sensor, wherein the support structure is actuated based at least partially upon the height or the distance.

5. The method of claim 3, wherein the droplets are jetted onto an upper surface of the support structure in the extended position.

6. The method of claim 3, wherein the support structure actuates into the extended position to contact a portion of the overhang after the portion of the overhang has been formed and before the portion of the overhang solidifies.

7. The method of claim 3, further comprising actuating the support structure from the extended position back into the retracted position after the overhang solidifies.

8. The printing bed of claim 1, wherein the support apparatus is configured to move on the upper surface.

9. The printing bed of claim 1, wherein the support apparatus is configured to move in a horizontal plane on the upper surface.

10. The printing bed of claim 1, wherein the support apparatus comprises a cart having one or more wheels that are configured to move on the upper surface.

11. The printing bed of claim 1, wherein the support structure is configured to pivot around a point and/or to rotate around an axis to have the same angle as the overhang.

12. The printing bed of claim 1, wherein the support apparatus is configured to move the support structure in three dimensions.

13. The printing bed of claim 1, wherein the support apparatus is configured to rotate the support structure around an axis and to rotate the support structure around a point.

14. The printing bed of claim 1, wherein the support structure is configured to actuate in response to a measurement from a downward-facing sensor, and wherein the measurement represents a distance between the sensor and a current top layer of the 3D object.

15. The printing bed of claim 1, wherein the support apparatus comprises a neck that is configured to raise and lower the support structure to a level of the overhang.

16. The printing bed of claim 1, wherein the support apparatus comprises a counterweight that is configured to counter a weight of the support structure and/or the overhang.

17. A printing bed for a three-dimensional (3D) printer, the printing bed comprising:

an upper surface configured to have a plurality of droplets land thereon to form a first layer of a 3D object; and a support apparatus that is configured to move on the upper surface, wherein the support apparatus comprises a support structure and is configured to move the support structure in three dimensions, to rotate the support structure around an axis, to pivot the support structure around a point, or a combination thereof, wherein, in response to the 3D object comprising an overhang with an angle that exceeds a predetermined threshold, the support structure is configured to actuate from a first position into a second position to support the overhang, and wherein the support apparatus comprises:

one or more wheels that move on the upper surface, wherein the one or more wheels are configured to rotate, swivel, or both to allow the support apparatus to move on the upper surface with a 360 degree range of motion; and
a counterweight positioned on an opposite side of the one or more wheels from the support structure, wherein the counterweight is configured to counter a weight of the support structure, the overhang, or both, and wherein the counterweight comprises electronics of the support apparatus.

* * * * *